United States Patent
Su et al.

(10) Patent No.: US 7,273,560 B2
(45) Date of Patent: Sep. 25, 2007

(54) APPARATUS FOR CONDENSING AND RECYCLING STRIPPER

(75) Inventors: Ta Sen Su, Taichung (TW); Chien Chou, Hualian (TW); Ji Luen Chen, Yunghe (TW)

(73) Assignee: AU Optronics Corp., Hsinchu (TW)

( * ) Notice: Subject to any disclaimer, the term of this patent is extended or adjusted under 35 U.S.C. 154(b) by 629 days.

(21) Appl. No.: 10/735,653

(22) Filed: Dec. 16, 2003

(65) Prior Publication Data

US 2004/0256060 A1    Dec. 23, 2004

(30) Foreign Application Priority Data

May 15, 2003    (TW)    ............................. 92113207 A

(51) Int. Cl.
  B01D 3/42    (2006.01)
  B01D 35/00   (2006.01)
  F16K 31/02   (2006.01)
  G05D 9/12    (2006.01)
  C02F 1/00    (2006.01)

(52) U.S. Cl. ............. 210/739; 210/744; 210/749; 210/143; 210/103; 210/97; 95/288; 95/24; 95/8; 95/1; 96/397; 96/417; 96/408; 203/98; 203/99

(58) Field of Classification Search ......... 210/739, 210/744, 143, 97, 103; 95/288, 24, 8; 96/397, 96/417, 408
See application file for complete search history.

(56) References Cited

U.S. PATENT DOCUMENTS

| | | | | | |
|---|---|---|---|---|---|
| 3,920,550 | A | * | 11/1975 | Farrell et al. | 210/86 |
| 4,030,521 | A | * | 6/1977 | Karlsson | 137/565.3 |
| 4,230,533 | A | * | 10/1980 | Giroux | 203/1 |
| 4,396,435 | A | * | 8/1983 | West et al. | 134/10 |
| 4,560,323 | A | * | 12/1985 | Orchard | 417/27 |
| 6,026,837 | A | * | 2/2000 | Chen | 137/2 |
| 6,148,838 | A | * | 11/2000 | Tsay et al. | 137/2 |
| 6,311,711 | B1 | * | 11/2001 | Skoglund | 137/2 |

* cited by examiner

Primary Examiner—Duane Smith
Assistant Examiner—Ives Wu
(74) Attorney, Agent, or Firm—Bacon & Thomas, PLLC

(57) ABSTRACT

An apparatus for recycling the stripper solutions with higher recycling rate is disclosed. The apparatus includes a stripper condenser; a first buffer tank; a second buffer tank connecting to said stripper condenser by a first pipe and connecting to said first buffer tank by a second pipe; a recycling device connecting to said first buffer tank by a fourth pipe; a first pump mounted on said first pipe; a second pump mounted on said second pipe; a concentration detector mounted in said stripper condenser; and a controller electrically connected to said concentration detector, said flow meter, and said liquid level sensor for receiving the signals therefrom, and electrically connected to said first pump and said second pump for sending on-off messages to said second pump.

16 Claims, 2 Drawing Sheets

APPARATUS FOR CONDENSING AND RECYCLING STRIPPER

BACKGROUND OF THE INVENTION

1. Field of the Invention

The present invention relates to an apparatus for condensing and recycling liquids and, more particularly, to a method and an apparatus for increasing the uniformity of concentration of stripper in a stripper recycling system.

2. Description of Related Art

During the processing of semiconductors or flat panel displays, photoresists are required for carrying out photolithography and etching procedures to form specific circuit patterns on silicon substrates. After the etching, a stripper solution is applied to strip out redundant photoresists.

Currently, most of the exhausted strippers are collected and drained to a stripper buffer tank by collection pipes. The recycled stripper collected by the stripper buffer tank is a mixture of solvents, base and photoresist in most cases. For example, the common recycled stripper is composed of 19.3% of MEA, 77% of BDG, 3% of PR, and 0.7% of $H_2O$. The other exhausted stripper not directly drained to the stripper buffer tank are first drawn to a stripper condenser by the exhaust system, and further become a condensed liquid composed of 50% of MEA, 23% of BDG, and 27% of $H_2O$, and is then conducted into the stripper buffer tank. After being mixed in the stripper buffer tank, the recycled liquids and condensed liquids are purified by the recycling system to have a required concentration for reuse in normal processes.

A liquid waste disposing device is commonly mounted in the stripper recycling system. The liquid waste disposing device installed in the stripper recycling system can drain unusable liquids to another liquid waste processing system. The recycling system is preset with an exhaust amount of liquid waste according to the concentration of impurity in a previous feedstock of a recycling system so that the recycled liquids produced by the recycling system may meet the requirements of normal processes. If the concentration of impurity according to which the recycling system is preset with an exhaust amount of liquid waste is relatively less than the actual concentration of impurity of the feedstock to recycling system, i.e., the concentration of impurity of the feedstock to recycling system is relatively high, the recycled liquid obtained will not match the required qualities and can not be reused. In this situation, the exhaust amount needs to be enlarged for ensuring the recyclability of recycled liquids produced by the recycling system. Therefore, the exhaust amount of liquid waste preset in the recycling system must be based on the possible highest concentration of impurities of feedstock to the recycling system if the concentrations of impurities of the feedstock are not stable. However, such a concentration will result in too much exhaust of usable chemicals and cause a decrease of the recycling rate and results in a waste of resources.

Therefore, it is desirable to provide an improved apparatus and method for condensing and recycling strippers to mitigate and/or obviate the aforementioned problems.

SUMMARY OF THE INVENTION

The object of the present invention is to provide an apparatus for condensing and recycling strippers so that the recycling rate of exhausted stripper is raised, the waste amount of usable stripper is reduced, the uniformity of concentration of recycled stripper is increased, and the concentration of recycled stripper is kept constant.

Another object of the present invention is to provide a method for condensing and recycling stripper so that the recycling rate of exhausted stripper is raised, the waste amount of usable stripper is reduced, the uniformity of concentration of recycled stripper is increased, and the concentration of recycled stripper is kept constant.

To achieve the object, the apparatus for condensing and recycling strippers of the present invention includes a stripper condenser; a first buffer tank; a second buffer tank connecting to said stripper condenser by a first pipe and connecting to said first buffer tank by a second pipe; a liquid waste disposing device connecting to said first pipe by a third pipe; a recycling device connecting to said first buffer tank by a fourth pipe; a first pump mounted on said first pipe; a second pump mounted on said second pipe; a concentration detector mounted in said stripper condenser; a flow meter mounted on said second pipe; at least a liquid level sensor mounted in said second buffer tank; and a controller electrically connected to said concentration detector, said flow meter, and said liquid level sensor for receiving the signals therefrom, and electrically connected to said first pump and said second pump for sending on-off messages to said second pump.

To achieve another object, the method for increasing the uniformity of the concentration of stripper includes (A) providing an apparatus for condensing and recycling stripper including a stripper condenser; a first buffer tank; a second buffer tank connecting to said stripper condenser by a first pipe and connecting to said first buffer tank by a second pipe; a liquid waste disposing device connecting to said first pipe by a third pipe; a recycling device connecting to said first buffer tank by a fourth pipe; a first pump mounted on said first pipe; a second pump mounted on said second pipe; a concentration detector mounted in said stripper condenser; a flow meter mounted on said second pipe; at least one first liquid level sensor mounted in said second buffer tank; a first valve mounted on said third pipe, a second valve mounted on said first pipe, a third valve mounted on said second valve, and a controller electrically connected to said concentration detector, said flow meter, and said liquid level sensor for receiving signals therefrom, and electrically connected to said first pump and said second pump for sending on-off messages to said second pump; (B) collecting the condensed stripper from said stripper condenser; (C) setting an alarmed water concentration of the stripper at said controller or concentration detector in said stripper condenser for driving an alarm; (D) monitoring the water concentration of the stripper by said concentration detector, wherein said second valve is opened, said first valve is closed, and thereby said stripper flows into said second buffer tank if the water concentration of said stripper is lower than said alarmed water concentration; or said second valve is closed, said first valve is opened, and thereby said stripper flows into said liquid waste disposing device if the water concentration of said stripper is higher than said alarmed water concentration; (E) calculating a flow rate in said controller according to the period of the on time of said first pump and the quantity of the total liquid transferred by said first pump, converting said flow rate to an open degree of said third valve, and sending said open degree to said third valve electrically; and (F) regulating the flow rate through said third valve according to the signals sent from said controller, and thereby making the stripper in said second buffer tank flow into said first buffer tank.

There exists a relatively large concentration difference between the condensed liquid collected by the stripper condenser and the recycled liquid drained directly from the processing equipment. In order to prevent the concentration of liquids fed into the stripper recycling system from fluctuating when the condensed liquid is introduced, and to avoid causing an adverse effect to the running of the recycling system, an additional buffer tank and controller are mounted between the condenser and the stripper buffer tank so that monitoring of the concentration of the stripper condensation in the condenser may be maintained, which makes the immediate regulation of opening degree of valves and flow rate according to real time situations possible. As a result, the final concentration of condensed liquid drained into the stripper buffer tank is appropriately controlled.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
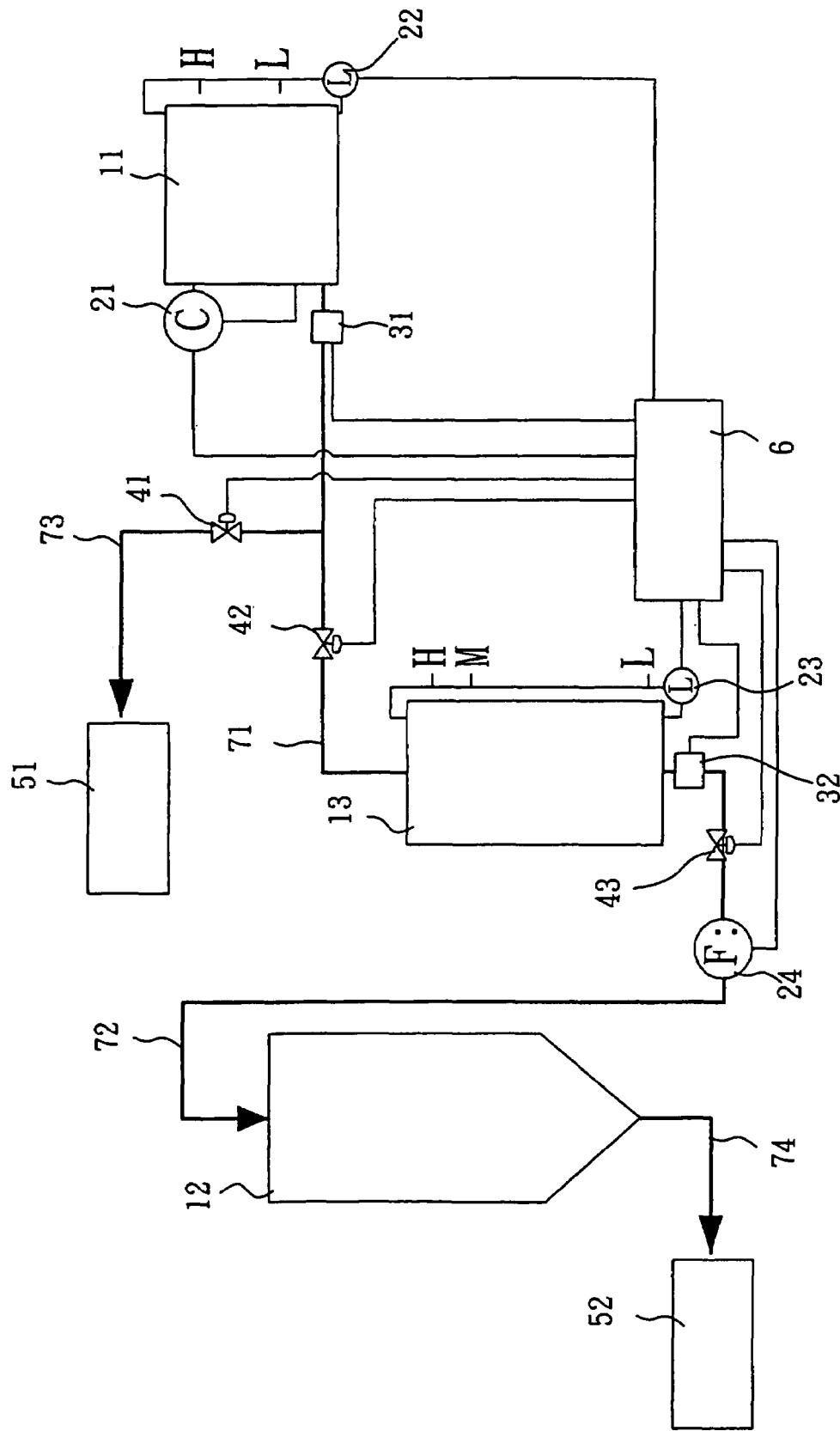
FIG. 1 is an installation configuration of a preferred embodiment according to the present invention.

With reference to FIG. 1, there is shown an installation configuration of the preferred embodiment according to the present invention. A stripper condenser 11 connects to a second buffer tank 13 by a first pipe 71, and the second buffer tank 13 connects to a first buffer tank 12 by a second pipe 72. In addition to that, a third pipe 73 connects the first pipe 71 with a liquid waste disposing device 51, and a fourth pipe 74 connects the first buffer tank 12 with a recycling system 52. A concentration detector 21 and a liquid level sensor 22 are mounted in the condenser 11. A first pump 31 is mounted on the first pipe 71 and near condenser 11, a first valve 41 is mounted on the third pipe 73, and a second valve 42 is mounted on the first pipe 71 and near the third buffer tank 13. A liquid level sensor 23 is mounted in the second buffer tank 13, and a second pump 32, a third valve 43, and a flow meter 24 are mounted on the second pipe 72 in proper order. All of the concentration detector 21, liquid level sensors 22,23, and flow meter 24 are electrically connected to a controller 6 so that the detected signals can be transferred to and computed by the controller 6. Furthermore, the first pump 31 and second pump 32 are also electrically connected to the controller 6 for receiving on-off messages sent from the controller 6. Also, the first valve 41, the second valve 42, and the third valve 43 are all electrically connected to the controller 6 for receiving the on-off messages or even the open degree signals. The liquid level sensor 22 mounted in condenser 11 is preset with a high liquid level H and a low liquid level L. Similarly, the liquid level sensor 23 mounted in the second buffer tank 13 is preset with a high liquid level H, a medium liquid level M, and a low liquid level L.

Figure 2:
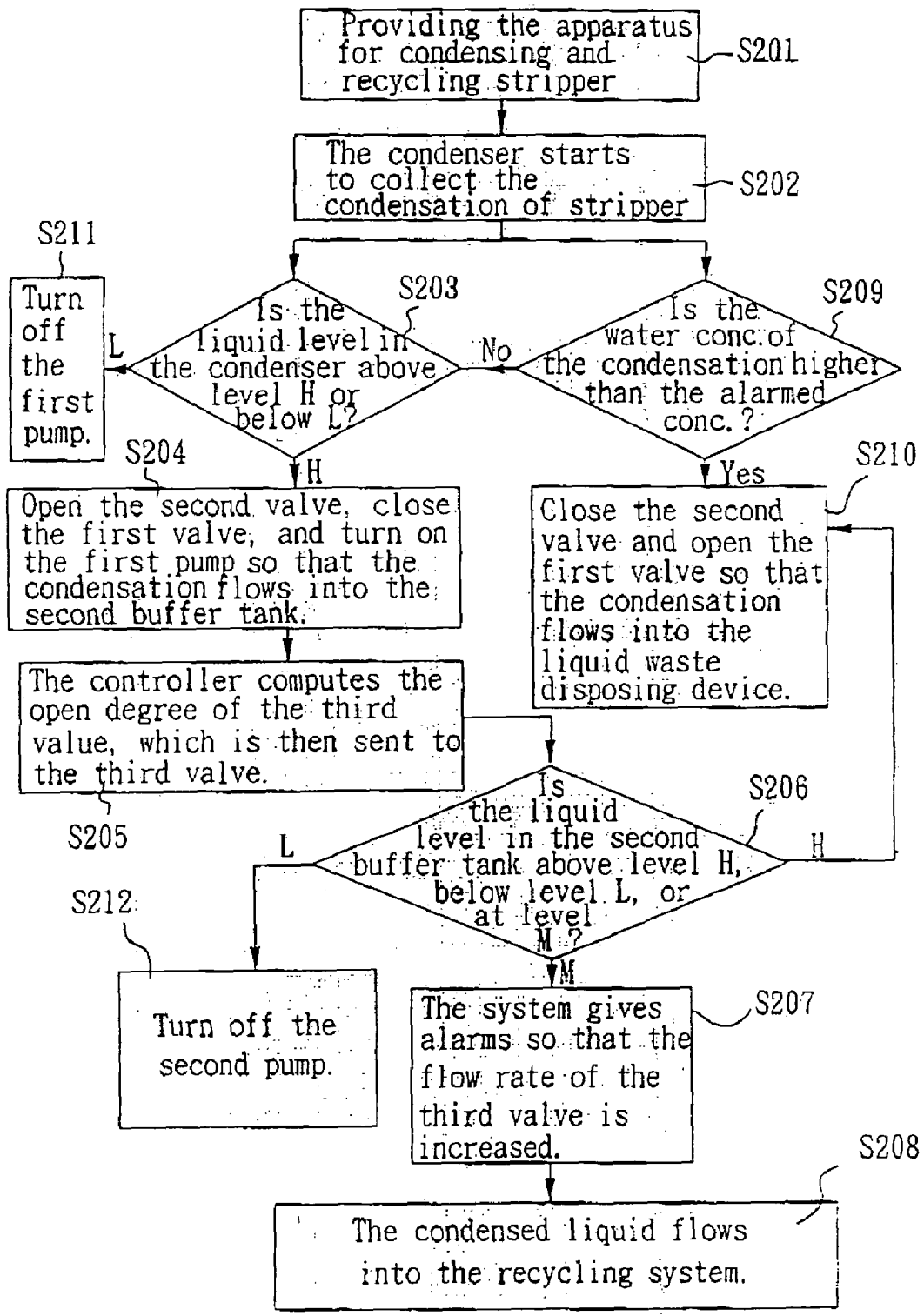
FIG. 2 is a flow chart of the preferred embodiment of FIG. 1.

FIG. 2 is a flow chart of the preferred embodiment of FIG. 1. First, an apparatus for condensing and recycling stripper as shown in FIG. 1 is provided (in step S201). Then, the stripper condenser 11 begins to collect condensed liquid (in step S202). After that, two routes may be chosen. The main route (in step S203) is if the liquid level in the condenser is above level H, then the second valve 42 is opened, the first valve 41 is closed, and the first pump 31 is turned on so that the condensed liquid may flow into the second buffer tank 13, and if the liquid level in the condenser is below level L, then the first pump is turned off to stop exhausting condensed liquid. The sub-route is that an alarmed concentration is set in the concentration detector 21 mounted in the condenser 11, and if the water concentration detected by the concentration detector 21 is higher than the alarmed concentration (in step S209), then the second valve 42 is closed, the first valve 31 is opened, and the condensed liquid is allowed to flow into the liquid waste disposing device (in step S210).

After the condensed liquid has flowed into the second buffer tank 13, the controller 6 computes the best flow rate according to the following equation (I):

$$\text{flow rate} = V/t \tag{I}$$

wherein "V" is the volume of the condensed liquid flowing into the second buffer tank 13 when the first pump 31 is running, and "t" is the average time calculated from the latest five time intervals between two starts of the first pump 13. Afterward, the optimal flow rate is converted into an open degree of the third valve 43, which is further converted into an electrical signal and sent to the third valve 43 (S205). During the operation of the second pump 32, the controller 6 keeps comparing the flow rate measured by the flow meter 24 with the computed value for ensuring the validity of the actual flow rate. However, it is necessary to pay attention to whether the running of the first pump is to drain the condensed liquid into the liquid waste disposing device, as, if that is so then this running time will not be counted.

After the liquid level sensor 23 in the second buffer tank 13 has sent the detected liquid level to controller 6, the controller 6 sends different signals according to the various liquid levels in the second buffer tank 13 (S206). When the liquid level in the condenser 11 rises to above level H, controller 6 sends signals of closing the second valve 42 and opening the first valve 41 (S210) so that the condensed liquid will not flow into the second buffer tank 13; when the liquid level falls below level L, controller 6 sends signals of turning off the second pump 32 (S212) so that the condensed liquid will not flow out of the second buffer tank 13; and when the liquid level reaches level M, the system will sound the alarm for increasing the flow rate of the third valve 43 automatically or manually (S207), which prevents excess condensed liquid from accumulating in the second buffer tank 13.

When everything is under control, the condensed liquid flows from the condenser 11 through the first pipe 71 into the second buffer tank 13, then flows through the second pipe 72 into the first buffer tank 12, and finally flows through the fourth pipe 74 into the recycling system 52.

From the aforementioned embodiment, it is obvious that the second buffer tank of the present invention is used for cushioning the condensed liquid collected by the condenser. Combined with the flow rate auto-controlling system, when the water content of the condensed liquid is stable, a small flow of condensed liquid collected by the condenser flows automatically into the first buffer tank (i.e., the stripper buffer tank in the prior arts), so that the compositions of feeds to the stripper recycling system can be kept constant, which further achieves the object of a stable operation of the whole system and ensures the quality of the recycled stripper. In comparison to the prior art, the recycling rate of the whole recycling system is raised, the waste of usable chemicals is reduced, the economical benefits of the system are increased, and the environmental target of waste reduction is achieved.

Moreover, if the water content of the condensed liquid suddenly increases, the concentration sensor will detect the abnormal concentration and make the condensed liquid containing excess water drain into the liquid waste disposing device so as not to affect the operation of the recycling system.

Although the present invention has been explained in relation to its preferred embodiment, it is to be understood that many other possible modifications and variations can be made without departing from the scope of the invention as hereinafter claimed.

What is claimed is:

1. An apparatus for condensing and recycling stripper comprising:
   a stripper condenser;
   a first buffer tank;
   a second buffer tank connecting to said stripper condenser by a first pipe and connecting to said first buffer tank by a second pipe;
   a recycling device connecting to said first buffer tank by a fourth pipe;
   a first pump mounted on said first pipe; a second pump mounted on said second pipe;
   a concentration detector mounted in said stripper condenser; and
   a controller electrically connected to said concentration detector, a flow meter, and a liquid level sensor for receiving the signals therefrom, and electrically connected to said first pump and said second pump for sending on-off messages to said second pump.

2. The apparatus as claimed in claim 1 further comprising a liquid waste disposing device connecting to said first pipe by a third pipe.

3. The apparatus as claimed in claim 2 further comprising a first valve mounted on said third pipe.

4. The apparatus as claimed in claim 3 further comprising a second valve mounted on said first pipe.

5. The apparatus as claimed in claim 4 further comprising a third valve mounted on said second pipe.

6. The apparatus as claimed in claim 5, wherein said first, second, and third valves are all electrically connecting to said controller.

7. The apparatus as claimed in claim 1 further comprising a flow meter mounted on said second pipe.

8. The apparatus as claimed in claim 7 further comprising at least one liquid level sensor mounted in said second buffer tank.

9. The apparatus as claimed in claim 8, wherein said controller further electrically connects to said flow meter and said liquid level sensor for receiving signals therefrom.

10. The apparatus as claimed in claim 9, wherein two liquid level sensors are respectively mounted in said stripper condenser and said second buffer tank, and both electrically connecting to said controller.

11. A method for increasing the uniformity of the concentration of stripper comprising:
   (A) providing an apparatus for condensing and recycling stripper; wherein said apparatus comprises: a stripper condenser; a first buffer tank; a second buffer tank connecting to said stripper condenser by a first pipe and connecting to said first buffer tank by a second pipe; a liquid waste disposing device connecting to said first pipe by a third pipe; a recycling device connecting to said first buffer tank by a fourth pipe; a first pump mounted on said first pipe; a second pump mounted on said second pipe; a concentration detector mounted in said stripper condenser; a flow meter mounted on said second pipe for sensing the flow rate in said second pipe; at least one first liquid level sensor mounted in said second buffer tank for sensing the level of the liquid surface in said second buffer tank; a first valve mounted on said third pipe, a second valve mounted on said first pipe, a third valve mounted on said second valve, and a controller electrically connected to said concentration detector, said flow meter, and said liquid level sensor for receiving signals therefrom, and electrically connected to said first pump and said second pump for sending on-off messages to said second pump;
   (B) collecting the condensed stripper from said stripper condenser;
   (C) setting an alarmed water concentration of the stripper at said controller or concentration detector in said stripper condenser for driving an alarm;
   (D) monitoring the water concentration of the stripper by said concentration detector, wherein said second valve is opened, said first valve is closed, and thereby said stripper flows into said second buffer tank if the water concentration of said stripper is lower than said alarmed water concentration; or said second valve is closed, said first valve is opened, and thereby said stripper flows into said liquid waste disposing device if the water concentration of said stripper is higher than said alarmed water concentration;
   (E) calculating a flow rate in said controller according to the period of the on time of said first pump and the quantity of the total liquid transferred by said first pump, converting said flow rate to an open degree of said third valve, and sending said open degree to said third valve electrically; and
   (F) regulating the flow rate through said third valve according to the signals sent from said controller, and thereby making the stripper in said second buffer tank flow into said first buffer tank.

12. The method as claimed in claim 11, further comprising a step (D'): providing a second liquid level sensor which is mounted on said stripper condenser and set with a first high liquid level and a first low liquid level, and turning on said first pump when the liquid level in said stripper condenser is above said first high liquid level, or turning off said first pump when the liquid level in said stripper condenser is below said first low liquid level.

13. The method as claimed in claim 11, further comprising a step (F') setting a second high liquid level, a second medium liquid level, and a second low liquid level in said first liquid level sensor mounted in said second buffer tank, and turning off said second pump when the liquid level in said second buffer tank is below said second low liquid level, or turning off said second valve and turning on said first valve when the liquid level in said second buffer tank is above said second high liquid level.

14. The method as claimed in claim 13, wherein the volume between said second high liquid level and said second low liquid level in said second buffer tank is larger than the volume between said first high liquid level and said first low liquid level in said stripper condenser.

15. The method as claimed in claim 11, wherein the flow rate of step (E) is calculated from the following equation (I):

$$\text{flow rate} = (V/t) \tag{I}$$

wherein V is the volume of stripper added into said second buffer tank when said first pump is running, and t is the average time calculated from the latest five time intervals between two starts of said first pump.

16. The method as claimed in claim 15, wherein the starting time of said first pump is not counted to said time of equation (I) when the concentration of the stripper in said condenser is higher than said alarmed concentration.

* * * * *